United States Patent [19]
Katsumata

[11] Patent Number: 5,202,598
[45] Date of Patent: Apr. 13, 1993

[54] BACK-UP BEARING FOR PERMANENT MAGNET BIASED MAGNETIC BEARING

[75] Inventor: Shin Katsumata, Rockford, Ill.

[73] Assignee: Sundstrand Corporation, Rockford, Ill.

[21] Appl. No.: 858,055

[22] Filed: Mar. 26, 1992

[51] Int. Cl.$^5$ .............................................. H02K 7/09
[52] U.S. Cl. ........................................ 310/90.5; 310/91; 310/156
[58] Field of Search .................... 310/90.5, 40 R, 91, 310/154, 156

[56] References Cited

U.S. PATENT DOCUMENTS

| | | | |
|---|---|---|---|
| 4,597,613 | 7/1986 | Sudo | 308/10 |
| 4,983,869 | 1/1991 | Vaidya et al. | 310/90.5 |
| 4,983,870 | 1/1991 | McSparran | 310/90.5 |
| 5,111,102 | 5/1992 | Meeks | 310/90.5 |

*Primary Examiner*—Steven L. Stephan
*Assistant Examiner*—Matthew Nguyen
*Attorney, Agent, or Firm*—Wood, Phillips, VanSanten, Hoffman & Ertel

[57] ABSTRACT

The disadvantage of complexity and size in back up bearings for permanent magnet biased magnetic bearings is avoided in a construction including a rotor (10) formed at least in part of magnetic material, at least two diametrically opposite magnetic poles (32, 34; 36, 38) about the rotor and terminating in ends slightly spaced therefrom to define a first gap ($G_1$), and electrical windings (42, 43) associated with each pole (32, 34, 36, 38). A collar (46) of magnetic material is axially spaced from the poles (32, 34, 36, 38) and has an opening (48) receiving the rotor (10) such that a small peripheral space exists between the opening (48) and the rotor (10). An array (44) of permanent magnets (45) is located in magnetic conducting relation with the collar (46) and the poles (32, 34, 36, 38) and a sleeve (50) of bearing material is disposed in the peripheral space and carried by the collar (46) to be spaced from the rotor (10) by a small gap ($G_2$).

8 Claims, 1 Drawing Sheet

BACK-UP BEARING FOR PERMANENT MAGNET BIASED MAGNETIC BEARING

FIELD OF THE INVENTION

This invention relates to bearings, and more particularly, to permanent magnet biased magnetic bearings and a back-up mechanical bearing therefor.

BACKGROUND OF THE INVENTION

Increasing interest is being expressed in magnetic bearings of various sorts In operation, such bearings journal a rotary part by means of a magnetic field. Actual contact between relatively rotating parts is completely avoided so long as the magnetic bearing is performing its function As a consequence, the bearing is virtually friction free and the only losses associated with rotation of a rotary part are so-called windage losses induced by aerodynamic drag on the surface of the rotating part.

Nonetheless, apparatus employing magnetic bearings requires provision for mechanical bearings as well. In the event of a power failure, or at the time of start up or shut down, a magnetic field sufficient to prevent mechanical contact between relatively rotating parts will not exist and mechanical contact will, in fact, result. If provision is not made to minimize friction resulting from such contact, substantial damage to the apparatus can result Consequently, it is the norm to provide some sort of a mechanical back-up bearing for a magnetic bearing to prevent the possibility of damaging frictional contact between relatively moving parts in such instances. Indeed, many rather elaborate schemes have evolved. For example, in U.S. Pat. No. 4,629,261 issued Dec. 16, 1986 to Eiermann, et al., a rotatable collar is journaled by ball bearings to a stator structure and is axially, but not radially, movable. In the event of a power failure or during start up or shut down, the stator structure is urged under the bias of a spring in an axial direction to engage the collar with a part of the rotary element to be journaled such that the collar rotates with the rotary element to provide a journal for the rotary element through the ball bearings to the stator.

While this approach may be effective, implementation is expensive because of the complexity of the same. Furthermore, to incorporate it in an apparatus requires an expansion of the overall size of the apparatus in order to house the back-up bearing and provide space for the requisite axial movement. Unfortunately, the drawbacks of complexity and undesirably large size are commonplace in back-up arrangements for magnetic bearings The present invention is directed to overcoming one or more of the above problems.

SUMMARY OF THE INVENTION

It is a principal object of the invention to provide a new and improved magnetic bearing. More specifically, it is an object of the invention to provide a new and improved back-up bearing for use with a permanent magnet biased magnetic bearing which is simple in construction and which does not require any increase in the size of the apparatus employing the same.

An exemplary embodiment of the invention achieves the foregoing objects in a permanent magnet biased magnetic bearing assembly construction including a rotor formed at least in part of magnetic material. At least two diametrically opposite magnetic poles are disposed about the magnetic part of the rotor and terminate in ends slightly spaced therefrom to define a first gap. Electrical windings are associated with each pole and a collar of magnetic material is axially spaced from the poles and has an opening receiving the magnetic part of the rotor such that a small peripheral space exists between the opening and the magnetic part of the rotor. An array of permanent magnets is located in magnetic conducting relation to the collar and the poles and a sleeve of bearing material is disposed in the peripheral space to be carried by one of the collar and the rotor part and to be normally spaced by a second small gap from the other of the collar and the rotor part.

As a consequence of the foregoing, the bearing material is disposed within the magnetic flux path required for operation of the bearing itself and thus does not require additional space. That is to say, the back-up bearing is entirely self-contained within necessary components of the permanent magnet biased magnetic bearing assembly itself.

In a preferred embodiment, the sleeve is mounted on the collar and spaced by the second small gap from the magnetic part of the rotor.

In a highly preferred embodiment, the first gap is slightly larger than the second gap. As a consequence, relative movement between the rotor and the poles will be such that the second gap closes first, insuring that the back up bearing will be engaged before the rotor can engage a pole.

In one embodiment of the invention, there are four of the magnetic poles which are angularly spaced from one another by 90°.

Preferably, the poles are joined to a ring and the array of permanent magnets is sandwiched between the ring and the collar.

In one embodiment, the array of permanent magnets is a series of permanent magnets arranged in a ring-like configuration located between the ring and the collar.

In a highly preferred embodiment, the permanent magnets have sufficient strength to magnetically saturate the collar. As a consequence, magnetic flux is not materially affected by the presence of the bearing within the flux path. Furthermore, effects of the proximity of relatively movable parts on magnetic attraction within bearing components is eliminated.

Still further, flux magnitude concerns are readily dealt with by appropriately sizing the collar which will be saturated in any event. Thus, the flux level within the flux path is set by the geometry of the collar and not by some other sort of adjustment which must be painstakingly made.

Other objects and advantages will become apparent from the following specification taken in connection with the accompanying drawings.

DESCRIPTION OF THE PREFERRED EMBODIMENT

Figure 1:
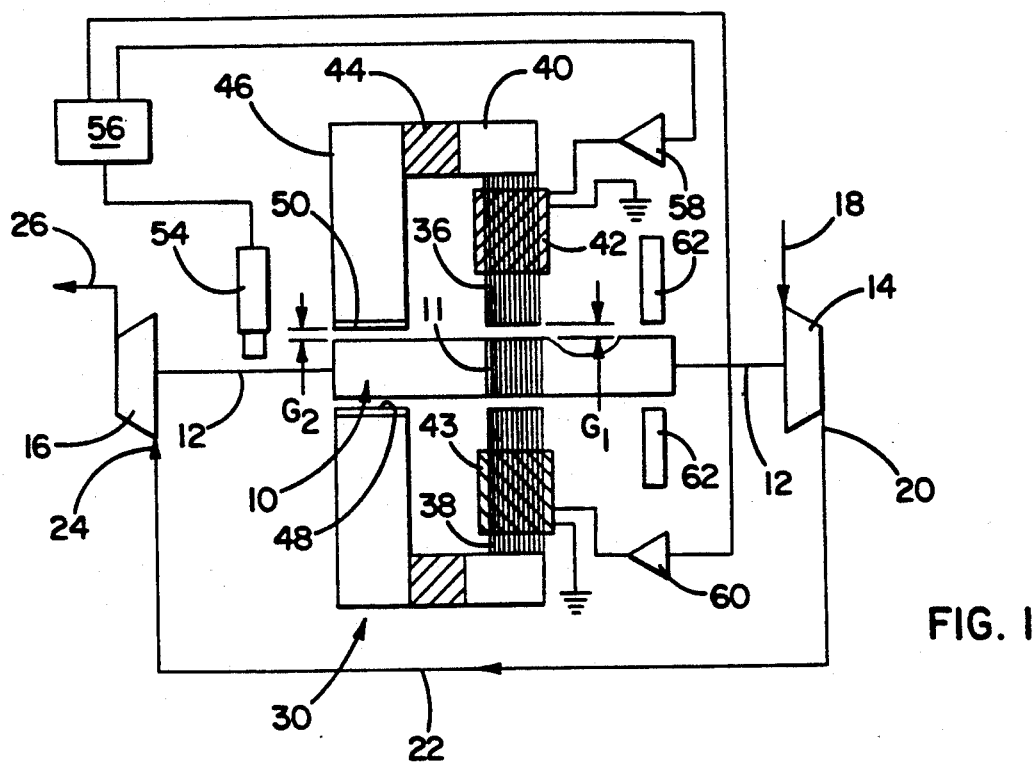
FIG. 1 is a schematic of an apparatus embodying a magnetic bearing made according to the invention.

An exemplary embodiment of a permanent magnet biased magnetic bearing assembly made according to the invention is illustrated in FIG. 1 in the context of a bearing for a motor driving a two-stage compressor.

However, it is to be understood that the magnetic bearing of the invention may be utilized in any of a large variety of applications where permanent magnet biased magnetic bearing assemblies may find use.

Included is a rotor, generally designated 10, made up at least in part of magnetic material. Frequently, soft iron laminations 11 will form part of the rotor 10. A shaft 12 extending from both sides of the rotor 10 is driven thereby. The right hand shaft end is associated with a centrifugal compressor 14 while the left hand end of the shaft 12 is associated with a centrifugal compressor 16. Ambient air may enter the compressor 14 at an inlet shown schematically at 18 and after compression, emerge from an outlet shown schematically at 20 to be passed via a conduit 22 to the inlet 24 of the compressor 16. Further compression of the air will result and the compressed gas is then directed to an outlet 26 and then conveyed to a point of use (not shown). In short, a two-stage centrifugal compressor is defined.

The rotor 10 is journaled by two, axially spaced magnetic bearings, generally designated 30, only one of which is shown. Each bearing 30 is associated with a magnetic part of the rotor 10 such that the rotor 10 is in a magnetic flux path.

Figure 2:
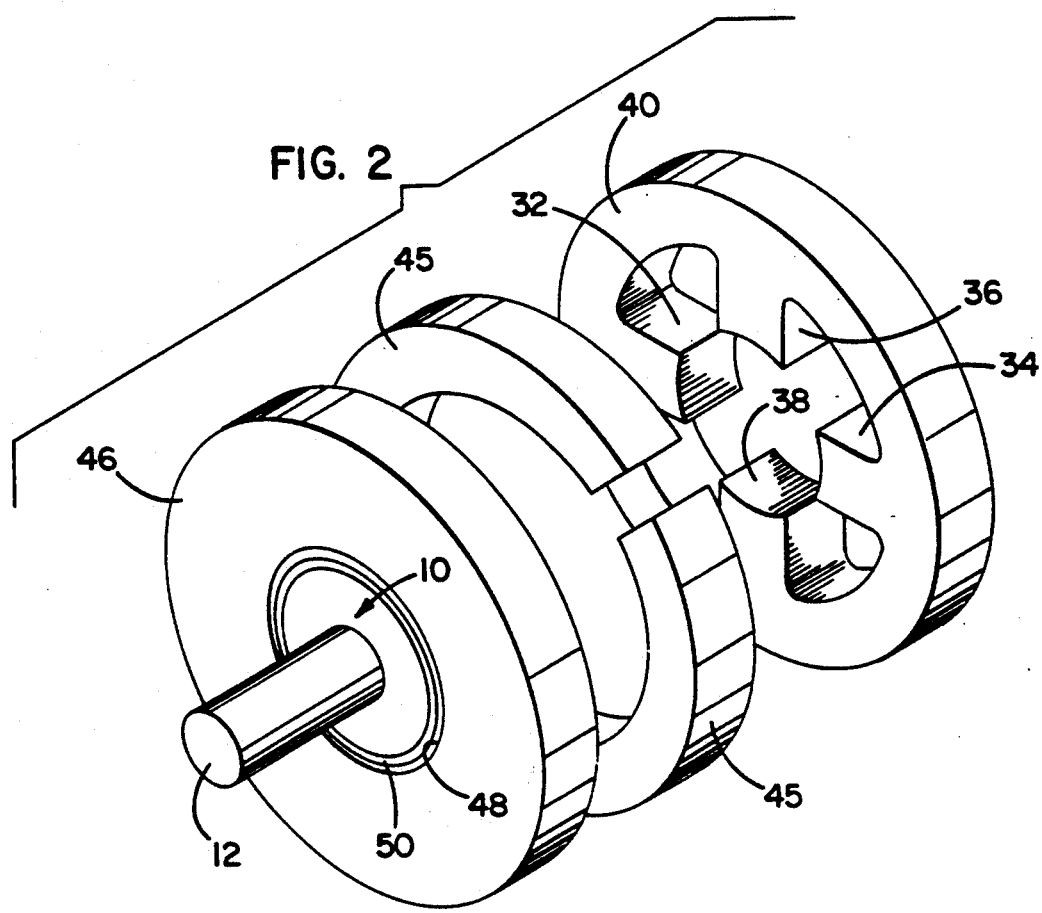
FIG. 2 is an exploded, partial view of components of the bearing.

As seen in FIG. 2, angularly spaced from one another by 90° are four inwardly directed poles 32, 34, 36 and 38, each formed of magnetic material. The poles 32 and 34 are diametrically opposite from one another as are the poles 36 and 38. The poles 32, 34, 36 and 38 are secured to, and preferably formed with a ring 40 also of magnetic material.

As seen in FIG. 1, electrical windings 42 and 43 are associated with the poles 36 and 38. Similar windings (not shown) are associated with the poles 32 and 34.

As can also be seen in FIG. 1, a small gap $G_1$ exists between the periphery of the rotor 10 and the radially inner extremity of each of the poles 32, 34, 36 and 38.

Axially adjacent the ring 40 is a ring-like array, generally designated 44, of permanent magnets. As seen in FIG. 2, the array 44 may be made up of a series of arcuate permanent magnets 45.

On the side of the array 44 opposite from the ring 40, a collar 46 of magnetic material is provided. Any suitable means (not shown) may be employed to draw the ring 40 and the collar 46 towards each other to sandwich the magnets 45 in their ring-like configuration between the collar 46 and the ring 40.

Returning to the collar 46, the same includes a generally central opening 48. The opening 48 receives a magnetic part of the rotor 10 such that a small peripheral space exists between the opening 48 and the periphery of the rotor 10. Within that space, a sleeve 50 of bearing material is located. In a preferred embodiment, the sleeve 50 of bearing material is actually mounted to the collar 46 such that a small gap, $G_2$ exists between the radially inner extremity of the sleeve 50 and the periphery of the rotor 10. Alternatively, however, the bearing material could be carried by the rotor 10 with the gap being located between the bearing material and the opening 48.

It is important to note that the gap $G_2$ between the sleeve 50 and the rotor 10 is smaller than the gap $G_1$ between the rotor 10 and the poles 32, 34, 36, 38. In a typical case, the gap $G_1$ will be on the order of 0.030 inches while the gap $G_2$ will be in the range of about 0.010 to 0.020 inches. The purpose of this construction will be described in greater detail hereinafter.

A pair of sensor and control systems of conventional construction are included. Typically, there will be two pick ups or proximity sensors 54, one for the X axis and one for the Y axis. That is, one of the sensors will be associated with, for example, the pair of poles 32 and 34 while the other will be associated with the pair of poles 36, 38.

The sensors 54 determine the relationship of the shaft 12 in relation to the stator and provide the resulting position information to a conventional controller 56. The controller 56 in turn provides control signals to two different power amplifiers 58 and 60, one associated with the winding 42 and the other associated with the winding 43. In a conventional fashion, the windings 42 and 43, and the windings (not shown) associated with the poles 32 and 34 and with other power amplifiers, another controller and another pick up, are employed to maintain the rotor 10 centered between the poles and out of contact with any parts of the stator.

A motor stator component 62 may also be conventionally associated with the rotor 10 for imparting a rotative force thereto.

It is important to note that the magnets 45 are selected so that at least part of the flux path is saturated. That part of the flux path is the collar 46 and the gap $G_2$.

With the foregoing in mind, the purpose of the relationship between the gaps $G_1$ and $G_2$ will now be explained. If, for any reason, the rotor 10 moves from its desired position, as, for example, during start up, shut down or in the event of a power failure, the annular gaps separating the rotor 10 from stationery structure will begin to close. The smaller gap $G_2$ at one bearing or another associated with the rotor 10 will close before the larger gap $G_1$ preventing the rotor from coming into contact with the radially inner faces of the poles 32, 34, 36 and 38. If the gap between the motor stator component 62 is similarly made larger than the gap $G_2$, in FIG. 1 equal to the gap $G_1$, damaging contact will be avoided at that location as well. In short, the mechanical bearing provided by the bearing sleeve 50 will take over before interfering contact between other parts can occur.

To this end, the bearing sleeve 50 may be made of any suitable bearing material. For example, carbon bearing material may be utilized. Alternatively, known ceramic bearing materials or even bronze bearings may be utilized in fabricating the sleeve 50.

As regards the point of saturating the collar 46 in the gap 50, a number of advantages are gained. For one, with saturation in this part of the flux path which includes the magnetic parts of the rotor, the poles 32, 34, 36, 38, the ring 40, the permanent magnets 45, the collar 46, the bearing sleeve 50 and, of course, the gaps $G_1$ and $G_2$, the presence of the bearing sleeve 50 does not materially interfere with flux transmission. Consequently, the bearing sleeve 50 can be conveniently located within the innards of a flux path that would be required by the magnetic bearing in any event and thus does not require additional space for its presence.

Furthermore, as a result of saturation across the gaps, magnetic attraction for the rotor 10 will not increase inversely with the spacing of the rotor from the collar 46. Magnetic attraction will be uniform for all positions of the rotor 10 within the bearing sleeve 50, thereby making it easier to control the bearing operation in total.

Finally, to the extent that a desired flux in the path is required as a result of the bias provided by the permanent magnets 45, it can be obtained by appropriately sizing the collar 46 to saturate at the desired level. This is in contrast to prior art designs where the desired flux in the path was selected by creating a gap between, for example, the magnetic array 44 and one or the other or both of the ring 40 and the collar 46 (or their prior art counterparts). Painstaking adjustment to obtain the proper gap providing the desired flux was often required and was quite difficult.

From the foregoing, it will be appreciated that the back up bearing for a magnetic bearing of the present invention is extremely simple in construction and does not require additional space within the apparatus to house the same. Thus, the disadvantages of size and complexity found in prior art back up bearings has been avoided.

I claim:

1. A permanent magnet biased magnetic bearing assembly comprising:
   a rotor formed at least in part of magnetic material;
   at least two diametrically opposed magnetic poles about said rotor part and terminating in ends slightly spaced from said rotor part to define a first gap:
   electrical windings associated with each said pole;
   a collar of magnetic material axially spaced from said poles and having an opening receiving said rotor part such that a small peripheral space exists between said opening and said rotor part;
   an array of permanent magnets in magnetic conducting relation with said collar and said poles; and
   a sleeve of bearing material disposed in said peripheral space to be carried by one of said collar and said rotor part and normally spaced by a second small gap from the other of said collar and said rotor part.

2. The permanent magnet biased magnetic bearing assembly of claim 1 wherein said first gap is slightly larger than said second gap.

3. The permanent magnet biased magnetic bearing assembly of claim 2 wherein there are four said magnetic poles angularly spaced from one another by 90°.

4. The permanent magnet biased magnetic bearing assembly of claim 1 wherein said poles are joined to a ring and said array is sandwiched between said ring and said collar.

5. The permanent magnet biased magnetic bearing assembly of claim 4 wherein said array is a series of permanent magnets arranged in a ring-like configuration between said ring and said collar.

6. The permanent magnet biased magnetic bearing assembly of claim 1 wherein said permanent magnets have sufficient strength to magnetically saturate said collar.

7. A permanent magnet biased magnetic bearing assembly comprising:
   a rotor formed at least in part of magnetic material;
   a ring mounting at least two diametrically opposed magnetic poles about said rotor part, said poles terminating in ends slightly spaced from said rotor part to define a first gap;
   electrical windings associated with each said pole;
   a collar of magnetic material axially spaced from said poles and having an opening receiving said rotor part such that a small peripheral space exists between said opening and said rotor part;
   an array of permanent magnets interposed between said ring and said collar to be in magnetic conducting relation with said collar and said poles; and
   a sleeve of bearing material disposed in said peripheral space to be carried by said collar and normally spaced by a second small gap from said rotor part.

8. A permanent magnet biased magnetic bearing assembly comprising:
   a rotor formed at least in part of magnetic material;
   at least two diametrically opposed magnetic poles about said rotor part and terminating in ends slightly spaced from said rotor part to define a first gap;
   electrical windings associated with each said pole;
   a collar of magnetic material axially spaced from said poles and having an opening receiving said rotor part such that a small peripheral space exists between said opening and said rotor part;
   a sleeve of bearing material disposed in said peripheral space to be carried by one of said collar and said rotor part and normally spaced by a second small gap from the other of said collar and said rotor part; and
   permanent magnet means magnetically interposed between said collar and said poles and of sufficient strength to saturate a magnetic flux path through said collar and said second gap.

* * * * *